Figure 3:
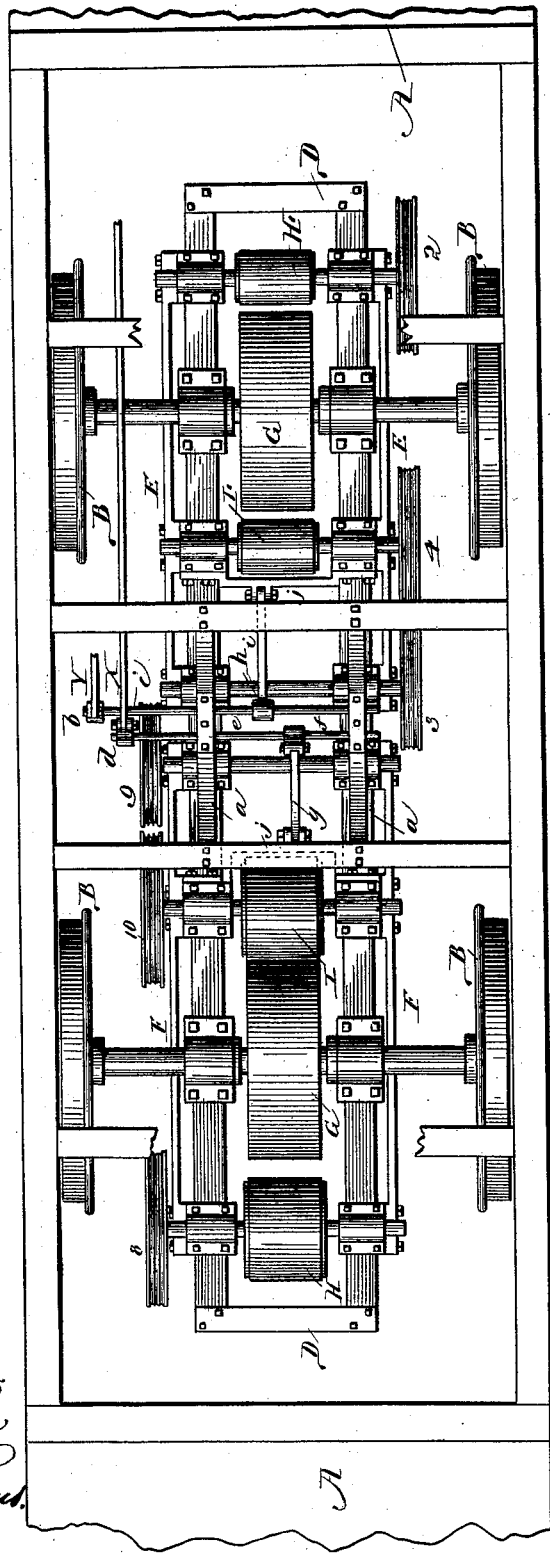

(No Model.) 2 Sheets—Sheet 1.
W. H. PATTON.
MOTOR FOR STREET CARS.
No. 409,115. Patented Aug. 13, 1889.
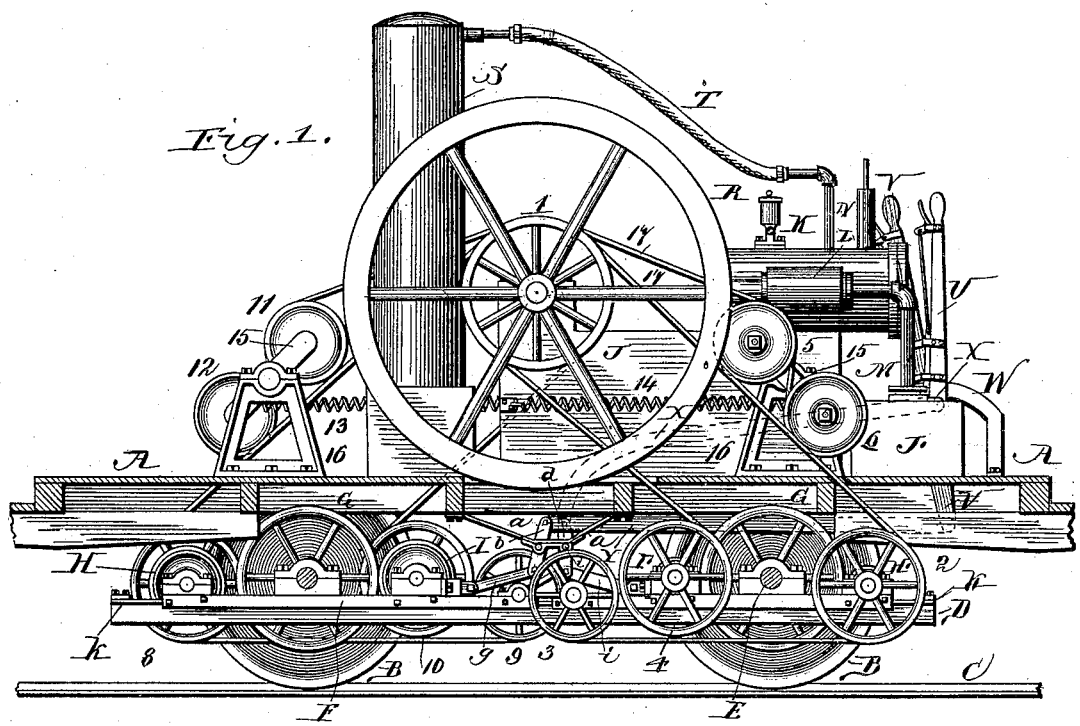
Witnesses
W. Rossiter
Albert H. Adams
Inventor
William H. Patton
By
Atty.

(No Model.) 2 Sheets—Sheet 2.

W. H. PATTON.
MOTOR FOR STREET CARS.

No. 409,115. Patented Aug. 13, 1889.

Witnesses
Inventor
William H. Patton

UNITED STATES PATENT OFFICE.

WILLIAM H. PATTON, OF ENGLEWOOD, ILLINOIS, ASSIGNOR TO THE PATTON MOTOR COMPANY, OF PUEBLO, COLORADO.

MOTOR FOR STREET-CARS.

SPECIFICATION forming part of Letters Patent No. 409,115, dated August 13, 1889.

Application filed February 25, 1889. Serial No. 301,003. (No model.)

*To all whom it may concern:*

Be it known that I, WILLIAM H. PATTON, residing at Englewood, in the county of Cook and State of Illinois, and a citizen of the United States, have invented certain new and useful Improvements in Motors for Street-Cars, of which the following is a specification, reference being had to the accompanying drawings, in which—
Figure 1 is a side elevation, partly in section, on line 11 of Fig. 2. Fig. 2 is a plan view. Fig. 3 is a plan view of the parts remaining when the floor with the parts mounted thereon is removed.
The object of this invention is to improve the construction of the motor shown in Patent No. 377,081, dated November 29, 1887, and to adapt it to a greater variety of movements and uses.
The nature and extent of my improvements will be pointed out in the claims.

The bottom A of the motor-car is made of framing and covered with a floor in the usual manner, and any suitable superstructure or housing may be mounted thereon for the protection of the operator and the machinery. The body or framing of the car is mounted on the wheels and axles B by suitable hangers or supports in the usual manner, and these wheels are to run on suitable rails C. Beneath this frame-work there is mounted upon or supported by the axles a sub-frame D, which is best made of iron, and, if desired, this lower frame D may have additional supports from the frame A. On the sub-frame D are mounted the bearings of all of the movable shafts, as shown in Figs. 1 and 3. The side bars of the frame are provided with flanges, as shown at *k* in Fig. 1, which project into corresponding grooves in the movable bearings to hold them in place. These movable bearings at one end are connected together by the bars E and at the opposite end by the bars F, so that they practically form secondary or movable frames mounted on the sub-frame D. The axles of the carrying-wheels are provided with friction-pulleys G, which are driven by the friction-pulleys H H' I I', according as either one is brought into driving contact with either of the friction-pulleys G, substantially in the manner set forth in the patent above referred to.

The sliding frames E F are given an endwise movement by means of the levers U V and connections, so as to be under the control of the driver or operator. The lever U is connected, by means of the link or rod X, with the lever or crank-arm *d* and rock-shaft *e*, which is provided with an arm *f*, which is in turn connected by the link *g* with the frame F, and at *j* with a cross-bar which is connected with or forms a part of the frame. The lever V is connected by the rod or link Y with an arm *b* on the rock-shaft *c*, which rock-shaft is provided with an arm *h*, which in turn is connected by a link or rod *i* to a similar connection *j* on the cross-bar of the frame E. The rock-shafts *c e* are supported in hangers *a*, which are attached to the frame A, and in practice it will be found advantageous to duplicate the arms *f h* and the links *g i* and locate them near the sides of the frames E F, so as to give these frames a more perfect movement with a less liability to bind on their supporting-frame D.

The levers U V are provided with ordinary locking-pawls engaging with metal racks W, provided with suitable notches to hold either of the levers in any position in which they may be adjusted.

It will be observed that the driving-pulleys H I in the frame F are larger than the driving-pulleys H' I' in the frame E, so that when either of the driving-pulleys H or I is thrown into driving-connection the car will have a faster movement than when either of the pulleys H' or I' are put in driving-connection, and the lever arrangements are such that either one of the four driving-pulleys may be put into driving contact at the will of the operator. The driving-pulley I is shown in driving-connection in Fig. 3, which of course carries the driving-pulley H out of working contact, while the pulleys H' I' are so adjusted that both are out of driving contact; and it will be understood that when either of the pulleys H' or I' is in driving contact both of the pulleys H and I will be so adjusted as to be out of driving contact.

The shifting of the driving-pulleys into and out of contact is for the purpose of reversing the movement of the car, as explained in my former patent, while in this motor I have applied a second set of smaller driving-rollers, so as to be able to vary the speed of the motor without changing the operation or movements of the power used for revolving these pulleys. This arrangement for changing the speed of the motor is important, as different rates of speed are frequently desirable, and for ascending grades the use of smaller driving-pulleys gives increased power with less speed, which is also desirable.

The driving mechanism is mounted on the framing or platform A, and, as shown, it consists of a gas-engine K, mounted on a suitable support J, which engine is provided with induction-ports and valves at N, which are operated by the eccentric-rod O, and exhaust-ports and valves at L, which are operated by the eccentric-rod P, and the exhaust is carried away by the pipe M and discharged into the exhaust-box J', from which the exhaust is discharged by any suitable pipe extended to the top of the car or cab. The details of the gas-engine are not specifically shown or stated, as the form shown is a common form, and I do not limit myself to any special form or kind of engine.

The gas may be carried in any suitable tank; but in the form shown I propose to generate gas or vapor from gasoline or other hydrocarbon oil, which may be carried in the small tank located at Z and connected by a suitable pipe with the valve-chest N. The heat of the engine will be sufficient to convert the gasoline into gas or vapor suitable for driving the engine after it has been in operation but a short time, and for the purpose of starting a separate heater or vaporizer may be applied. This part of the apparatus is not shown, as it forms no part of my invention.

The engine is provided with a water-jacket for cooling it, and the water is carried in the tank S and is delivered from this tank to the jacket by a connecting-pipe near the floor, (not shown,) and the water as it becomes warmed or heated is carried from the jacket and returned to the tank by the pipe T. This method may be used for keeping the engine cool, or any other suitable method may be adopted, as may be found most convenient.

The usual piston-rod is connected with the crank-shaft, and the crank-shaft is provided with the ordinary balance-wheel R. It is also provided with the driving-wheels 1 and 7, as shown in Fig. 2, and the power is communicated from these driving-wheels by means of wire ropes 17 and 18, which ropes, as shown, are carried four times around each wheel in each set of driving-gears, and the number of turns may be varied to suit circumstances and to furnish the necessary amount of driving-power, and, as understood, these driving-ropes are designed to be run continuously in one direction. The rope 17 in moving passes around the wheel 2, then around the idler 3 to the wheel 4, and back to the wheel 1. One of the strands or sections of the rope passes over the tightener-wheel 5 and under the wheel 6, which returns it to the line of the other strands or sections. The rope is continuous, and it will be understood that in moving it is crossed over, as shown at Fig. 2.

A tightener for one strand is sufficient. This tightener is formed by mounting the wheels 5 and 6 or 11 and 12 upon the fork 15, upon the ends of which the wheels are journaled, and the fork rotates in a shaft mounted upon and supported by the frame 16. The tightener for 11 and 12 has its tension adjusted and supported by the spring 13 and the tightener for 5 and 6 by the spring 14.

The rope 18 passes around the wheels 8, 9, and 10 in a manner similar to that of the rope 17. These ropes move lightly when the friction drive-wheels are both out of gear, so that there is no special loss of power in running both sets at the same time, and when both sets are running the driver can change the direction of the car or change the speed at will and almost instantaneously, thus making a complete motor variable as to the speed and direction of its movements, while the initial power is constant and the driving-ropes move continuously in the same direction, thus making the motor complete in all of its movements and giving it all of the motions and speeds required for operating passenger-cars or trains of cars in the streets of cities or towns and over tracks varying largely in their grades.

I have shown and described the belt as a wire rope; but other well-known forms of rope or cable may be used.

What I claim as new, and desire to secure by Letters Patent, is—

1. In a street-car motor constructed substantially as described, the combination of two systems of driving-gear connected with separate axles or trucks adapted to propel the motor-car at different rates of speed and in either direction from either axle by a single engine, substantially as specified.

2. The sub-frame D, in combination with the sliding frames E and F, each carrying separate driving-pulleys of a different size, substantially as described.

3. The combination of the rope or belt 17, wheels 1, 2, 3, and 4, and sliding frame E with the crank-shaft Q, rope or belt 18, and wheels 7, 8, 9, and 10, and sliding frame F, whereby the motive power may be operated continuously in one direction and the car moved in either direction with varying rates of speed, substantially as specified.

4. The rock-shaft e, having the arms d f, one or more link-rods g, and sliding frame F, with the link-rod X and hand-lever U, substantially as specified.

WILLIAM H. PATTON.

Witnesses:
HARRY T. JONES,
ALBERT H. ADAMS.